United States Patent
Chae et al.

(10) Patent No.: US 10,925,059 B2
(45) Date of Patent: Feb. 16, 2021

(54) METHOD AND APPARATUS FOR TRANSMITTING SIDELINK SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/490,516

(22) PCT Filed: Mar. 2, 2018

(86) PCT No.: PCT/KR2018/002541
§ 371 (c)(1),
(2) Date: Aug. 30, 2019

(87) PCT Pub. No.: WO2018/160036
PCT Pub. Date: Sep. 7, 2018

(65) Prior Publication Data
US 2020/0015230 A1    Jan. 9, 2020

Related U.S. Application Data

(60) Provisional application No. 62/466,352, filed on Mar. 2, 2017.

(51) Int. Cl.
*H04W 4/00* (2018.01)
*H04W 72/04* (2009.01)
(Continued)

(52) U.S. Cl.
CPC ......... *H04W 72/0453* (2013.01); *H04L 67/12* (2013.01); *H04W 4/40* (2018.02)
(Continued)

(58) Field of Classification Search
CPC .... H04W 72/0453; H04W 4/40; H04L 67/12; H04L 5/0053; H04L 5/0094; H04L 5/0044; H04L 27/2602
(Continued)

(56) References Cited

U.S. PATENT DOCUMENTS 10,524,255 B2 * 12/2019 Yi ..................... H04L 5/0037
2016/0128009 A1 * 5/2016 Yoon ................. H04W 4/70
370/350

(Continued)

FOREIGN PATENT DOCUMENTS

KR    1020160102501    8/2016
KR    1020160146703    12/2016
(Continued)

OTHER PUBLICATIONS

PCT International Application No. PCT/KR2018/002541, Written Opinion of the International Searching Authority dated May 28, 2018, 17 pages.

(Continued)

*Primary Examiner* — Chuong T Ho
(74) *Attorney, Agent, or Firm* — Lee Hong Degerman Kang Waimey

(57) ABSTRACT

An embodiment of the present invention relates to a method for transmitting a sidelink signal by a terminal in a wireless communication system, the method comprising the steps of: generating a sequence for transmitting a sidelink signal; mapping the sequence to a plurality of subcarriers around a sidelink direct current (DC) subcarrier; and transmitting a sequence for transmitting the mapped sidelink signal, wherein the location of the sidelink DC subcarrier has been inherited from a location of a DC subcarrier when the terminal transmits an uplink signal to a base station or a location of a DC subcarrier when the terminal receives a (Continued)

downlink signal from the base station. The first terminal is included in an autonomous vehicle.

13 Claims, 11 Drawing Sheets

(51) Int. Cl.
 *H04W 4/40* (2018.01)
 *H04L 29/08* (2006.01)
(58) Field of Classification Search
 USPC .................................................. 370/329, 330
 See application file for complete search history.

(56) References Cited

U.S. PATENT DOCUMENTS

| 2016/0295533 | A1 | | 10/2016 | Sorrentino | |
|---|---|---|---|---|---|
| 2017/0325260 | A1 | * | 11/2017 | Guo | H04L 27/265 |
| 2018/0035416 | A1 | * | 2/2018 | Yi | H04W 72/0406 |
| 2018/0124726 | A1 | * | 5/2018 | Zhang | H04W 72/0453 |
| 2019/0245724 | A1 | * | 8/2019 | Wang | H04L 27/2666 |

FOREIGN PATENT DOCUMENTS

| KR | 1020170020458 | 2/2017 |
|---|---|---|
| WO | 2015066632 | 5/2015 |

OTHER PUBLICATIONS

Panasonic, "Remaining issues on NR frame structure focusing on frequency domain", 3GPP TSG RAN WG1 Ad-Hoc Meeting, R1-1700545, Jan. 2016, 6 pages.

* cited by examiner (a)

(b)

(a)

(b)

METHOD AND APPARATUS FOR TRANSMITTING SIDELINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2018/002541, filed on Mar. 2, 2018, which claims the benefit of U.S. Provisional Application No. 62/466,352, filed on Mar. 2, 2017, the contents of which are all hereby incorporated by reference herein in their entirety.

TECHNICAL FIELD

The present disclosure relates to a wireless communication system, and more particularly, to a method and apparatus for receiving a sidelink signal in relation to a direct current (DC) subcarrier.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method of handling a direct current (DC) subcarrier for a sidelink and new radio access technology (NRAT).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a sidelink signal by a user equipment (UE) in a wireless communication system includes generating a sequence for sidelink signal transmission, mapping the sequence to a plurality of subcarriers around a sidelink direct current (DC) subcarrier, and transmitting the mapped sequence for sidelink signal transmission. A position of the sidelink DC subcarrier is inherited from a position of a DC subcarrier used when the UE transmits an uplink signal to a base station (BS) or a position of a DC subcarrier used when the UE receives a downlink signal from a BS.

In another aspect of the present disclosure, a UE for transmitting a sidelink signal in a wireless communication system includes a transmitter, a receiver and a processor. The processor is configured to generate a sequence for sidelink signal transmission, map the sequence to a plurality of subcarriers around a sidelink DC subcarrier, and transmit the mapped sequence for sidelink signal transmission. A position of the sidelink DC subcarrier is inherited from a position of a DC subcarrier used when the UE transmits an uplink signal to a BS or a position of a DC subcarrier used when the UE receives a downlink signal from a BS.

A plurality of DC subcarriers may be configured to be used when the UE transmits the downlink signal to the BS.

When a plurality of DC subcarriers are configured to be used when the UE transmits the downlink signal to the BS, and the sidelink DC subcarrier is indicated by signaling, the sidelink DC subcarrier may correspond to one of DC subcarriers configured for respective resource pools.

When a plurality of DC subcarriers are configured to be used when the UE transmits the downlink signal to the BS, and the sidelink DC subcarrier is indicated by signaling, the sidelink DC subcarrier may correspond to one of DC subcarriers configured for respective services.

The sidelink DC subcarrier may be commonly applied to resource pools.

A DC subcarrier used for the UE to transmit a sidelink synchronization signal may be determined independently of the sidelink DC subcarrier.

When different synchronization signals are transmitted for different services, a DC subcarrier used to transmit a sidelink synchronization signal may be aligned with the sidelink DC subcarrier.

The services may include vehicle to everything (V2X) and narrowband-Internet of things (NB-IoT).

The sidelink DC subcarrier may be located between subcarriers carrying data.

The sidelink DC subcarrier may overlap with a subcarrier carrying data.

The sidelink DC subcarrier overlapped with the subcarrier carrying data may be excluded from reference signal mapping.

When the sequence for sidelink signal transmission is a Zadoff-Chu sequence, the number of cyclic shifts (CSs) may be limited to a predetermined value or less.

Advantageous Effects

According to the present disclosure, a direct current (DC) subcarrier to be used for transmitting a signal, a synchronization signal, a reference signal, or the like on a sidelink and in new radio access technology (NR), and the relationship between the DC carrier and a DC carrier used for cellular communication may be specified.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE FOR CARRYING OUT THE INVENTION

Figure 1:
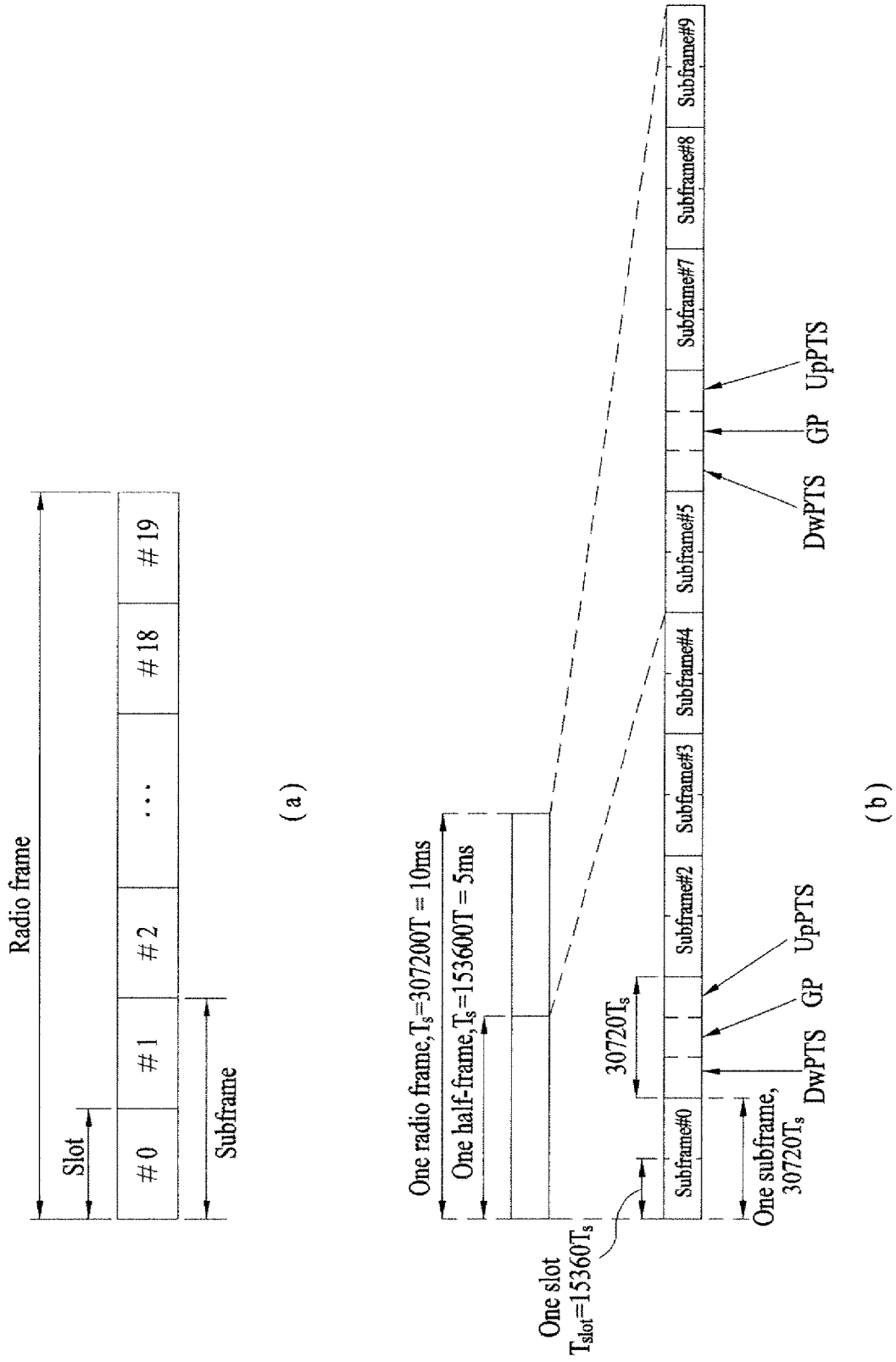
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-

OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
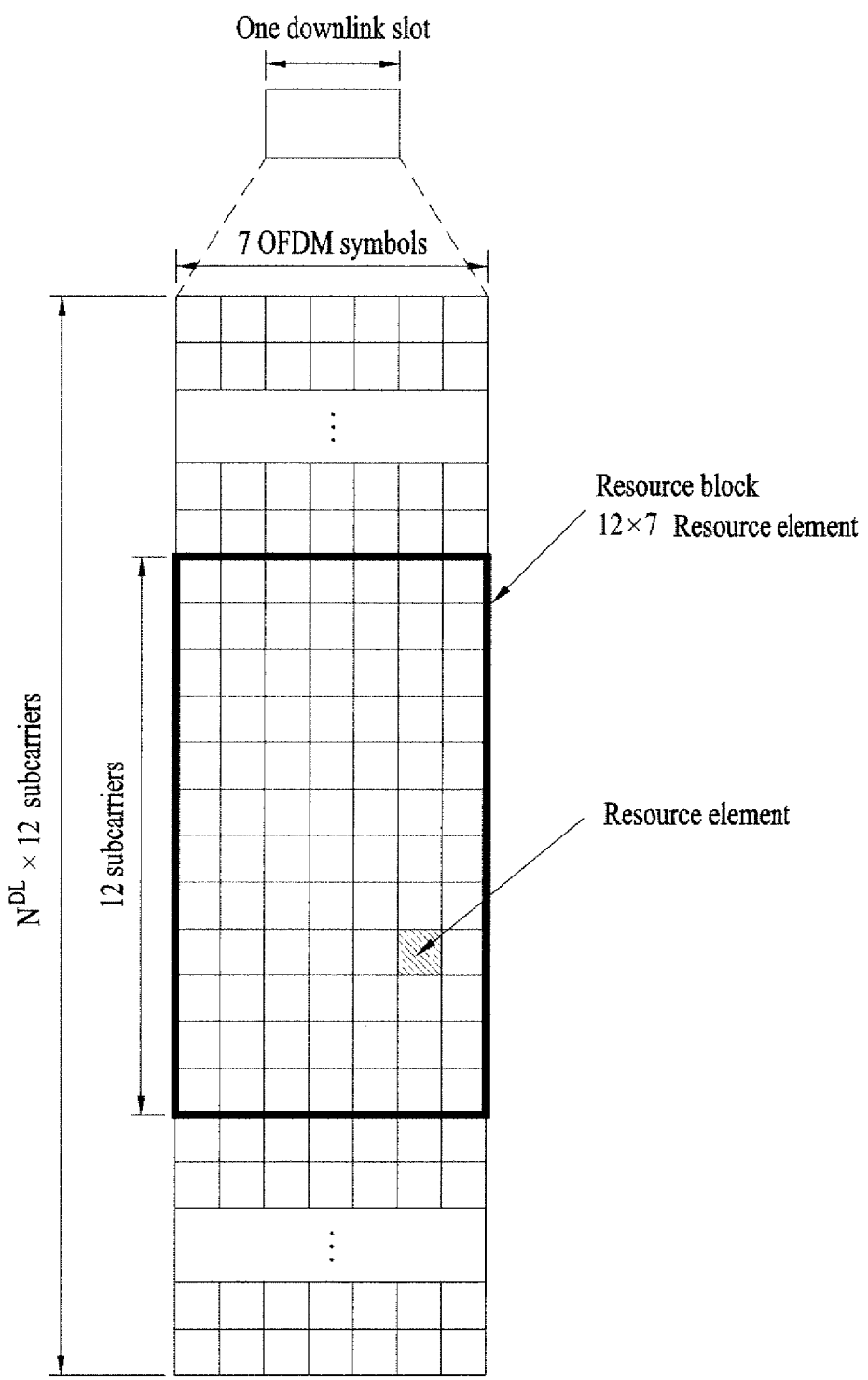
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
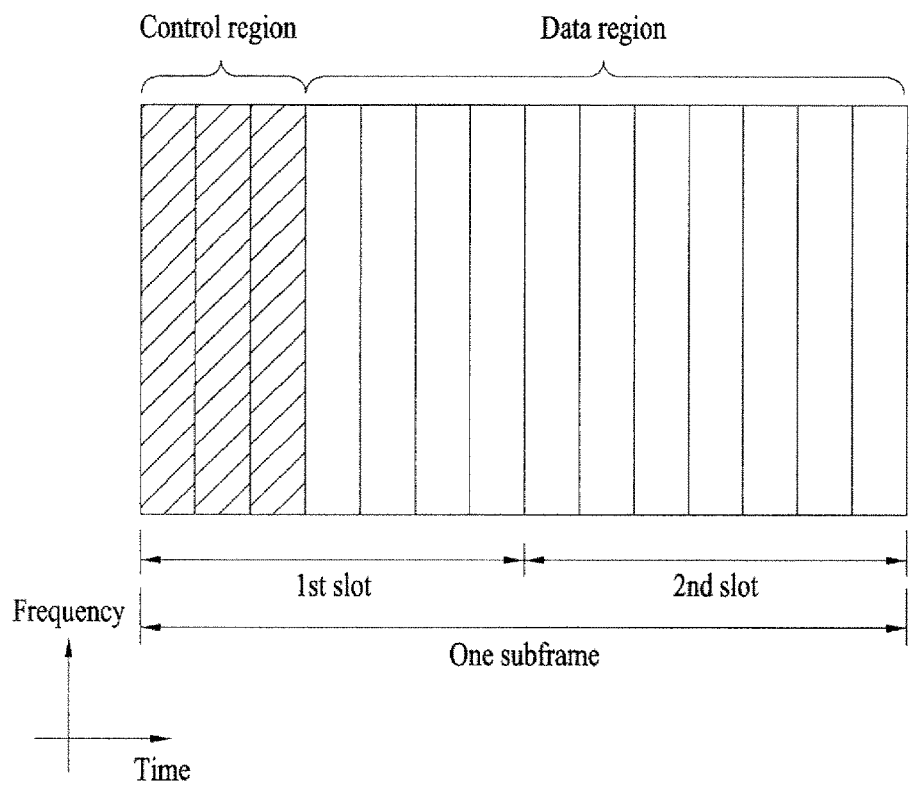
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
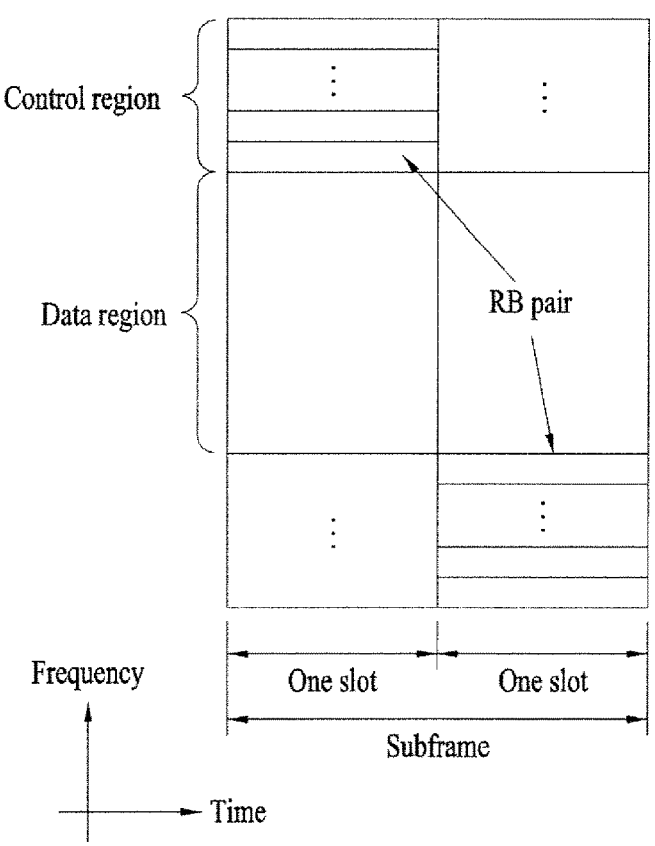
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
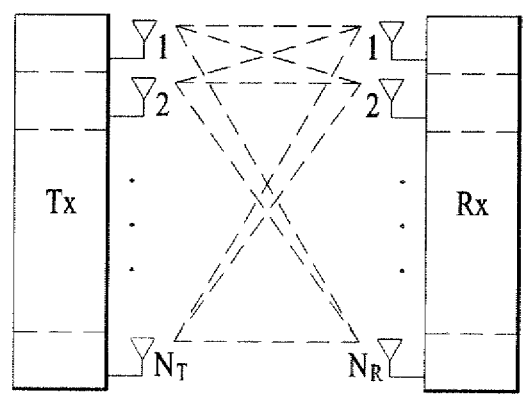
FIG. 5 is a view illustrating the configuration of a wireless communication system having multiple antennas.
Figure 5:
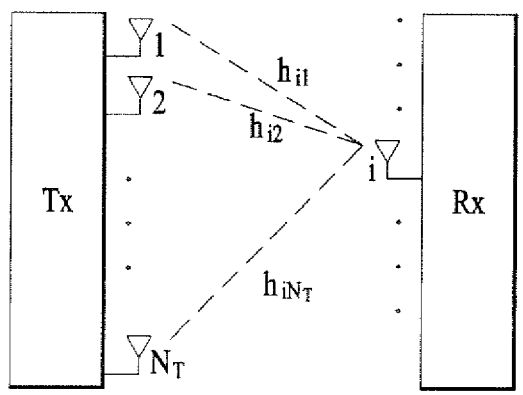

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in a MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in a MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}]$$ [Equation 7]

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
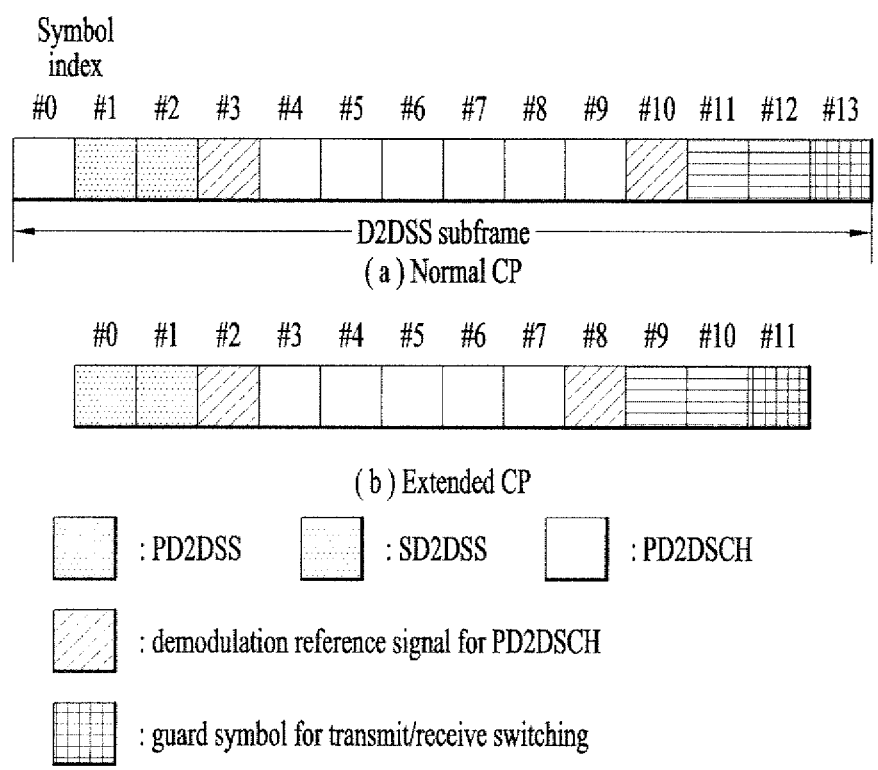
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/ repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
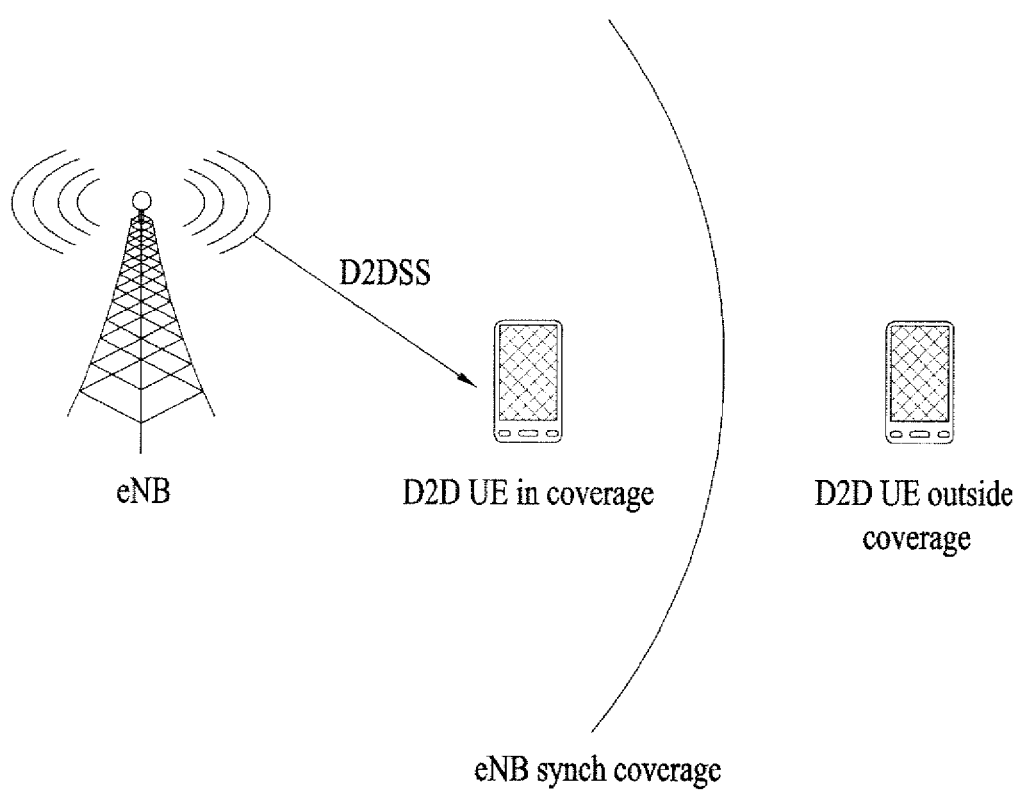
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
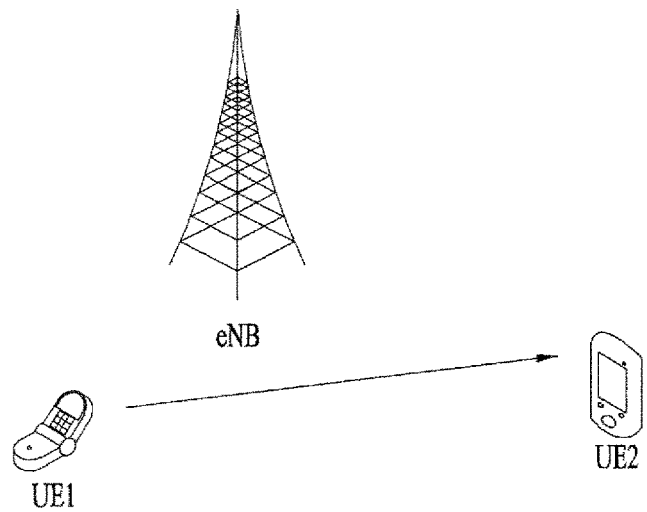
FIG. 8 is a view illustrating an exemplary D2D resource pool for D2D communication.
Figure 8:
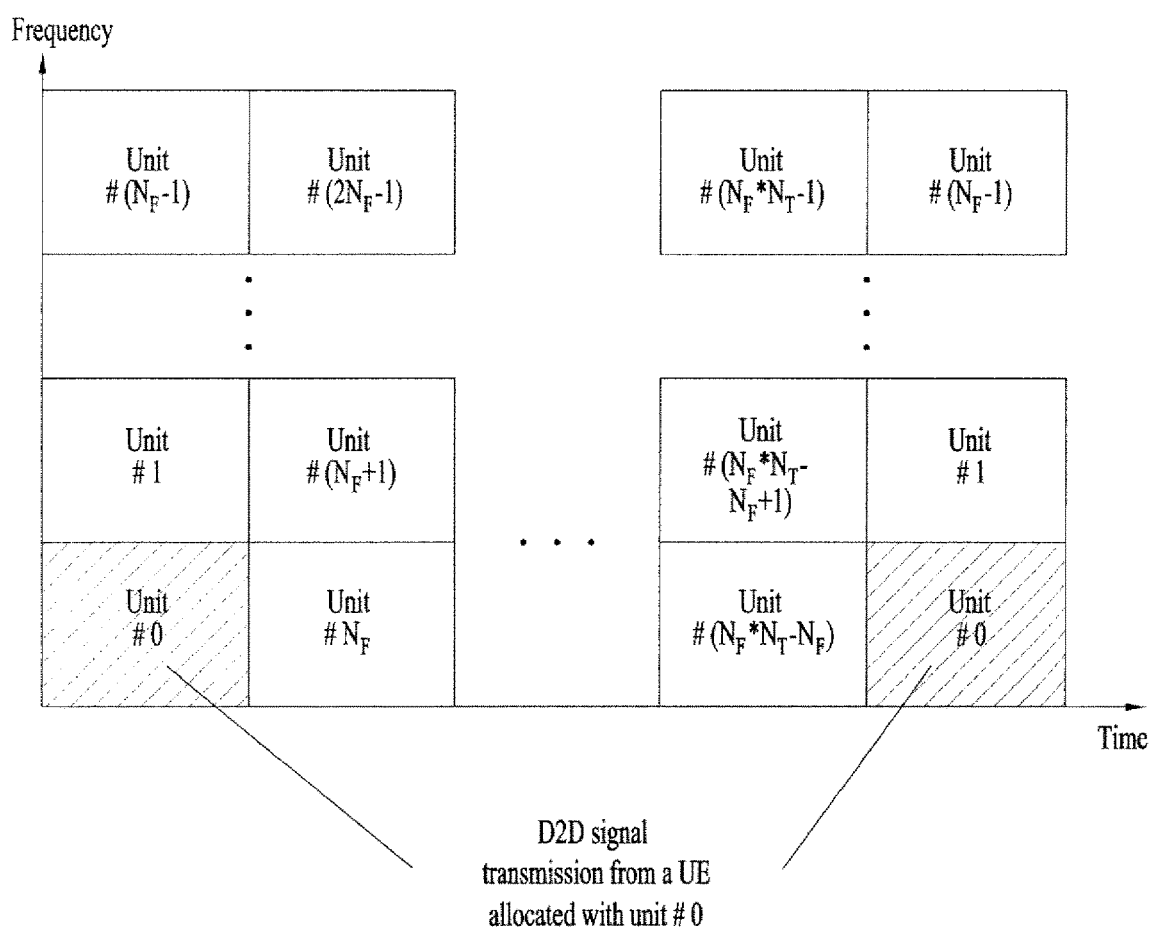

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, a SA resource pool may correspond to a pool of resources that a SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If a SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of a SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit a SA (D2D control signal, or sidelink control information (SCI)) in resources configured by an eNB. For a mode-2 UE, the eNB configures resources for D2D transmission. The mode-2 UE may select time-frequency resources from the configured resources and transmit a SA in the selected time-frequency resources.

Figure 9:
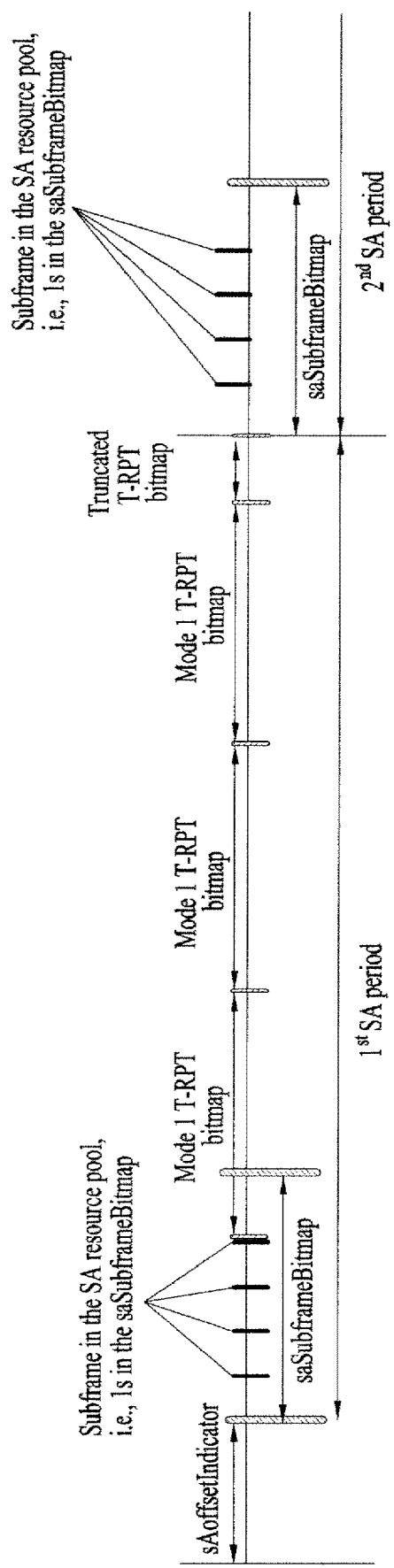
FIG. 9 is a view illustrating a scheduling assignment (SA) period.

A SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include a SA resource pool and a subframe pool for D2D data transmission. The SA resource pool may include the first subframe of the SA period to the last of subframes indicated as carrying a SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in a SA period except for a SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 10:
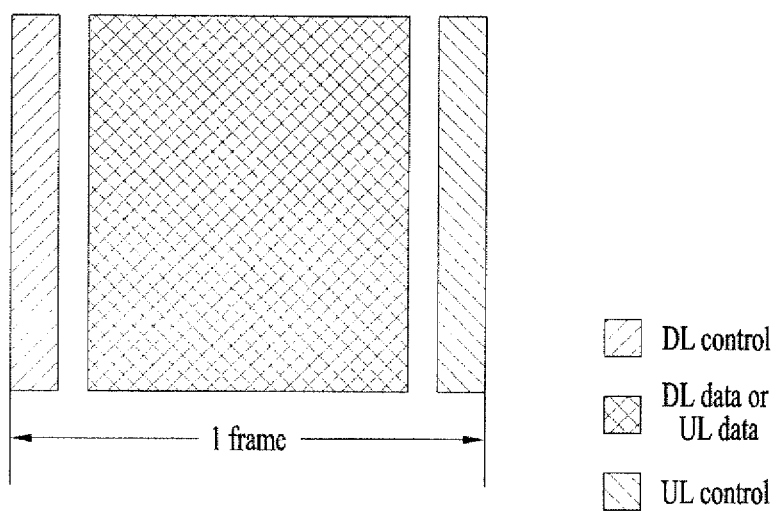
FIGS. 10 and 11 are views illustrating exemplary new radio access technology (NRAT) frame structures.
Figure 11:
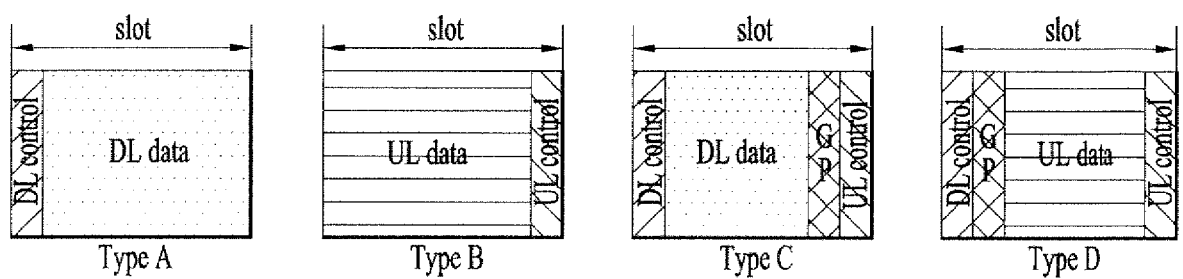

FIG. 10 illustrates an exemplary frame structure available for NR. Referring to FIG. 10, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Embodiment

In NR, efficient processing at a transmitter and a receiver may lead to a significant decrease in interference (or leakage) that a direct current (DC) subcarrier suffers, compared to a legacy modem. Therefore, it may be possible to transmit data on the DC subcarrier. However, without accurate knowledge of the position of the DC subcarrier, the receiver is likely to fail in receiving a signal at the accurate frequency position. Accordingly, there is a need for a method of indicating the position of a DC subcarrier to a receiver. This method may also be useful, when different services are multiplexed in one carrier. For example, when a service requiring low latency and a service requiring high throughput are simultaneously provided in one carrier, different DC subcarriers may be configured. On UL, only when UEs have the same DC subcarrier, the receiver may avoid multiple processes. In this context, to reduce reception complexity, it is necessary to indicate the position of a (common) DC subcarrier to a transmitter. Therefore, an eNB may also indicate the position of a DC subcarrier for UL to UEs.

Based on the above description, issues related to a DC subcarrier such as the position of a DC subcarrier for sidelink signal transmission or reception will be addressed. Before a detailed description of the issues, Table 1 below describes agreements regarding a DC subcarrier, which are under discussion. Table 1 serves as the basis of the following description and is incorporated in the present disclosure.

TABLE 1

Agreements:
    Regarding DC present within the transmitter,
        DC Handling of DC subcarrier in transmitter side is specified
            Receiver knows where DC subcarrier is or is informed (e.g., by specification or
            signaling) of where DC subcarrier is or if DC subcarrier is not present within receiver
            bandwidth
            When receiver is informed DC subcarrier is present, FFS: transmitter DC subcarrier is
            punctured, rate matched, modulated, or EVM is not specified
            When DC subcarrier is not present, all subcarriers within the receiver bandwidth are
            transmitted
Agreements:
    Receiver side
        No special handling of the DC subcarrier(s) on the receiver side is specified in RAN1
Behavior left to implementation, the receiver may for example puncture data received on the DC subcarrier
Agreements:
    Handling of transmitter DC subcarrier at the transmitter
        DL
            Note that gNB can suppress DC interference to the required level by implementation
            UE may assume transmit DC subcarrier at the transmitter (gNB) side is modulated i.e., data is
            neither rate-matched nor punctured.
            Signal quality requirement (e.g., EVM) corresponding to DC subcarriers is up to RAN4.
        UL
            Transmit DC subcarrier at the transmitter (UE) side is modulated i.e., data is neither rate-matched
            nor punctured.
            Signal quality requirement (e.g., EVM) corresponding to DC subcarriers is up to RAN4.
            The transmitter DC subcarrier at the transmitter (UE) side should avoid collisions at least with
            DMRS if possible
            The specification should define at least one particular subcarrier as the candidate position of DC
            subcarrier, e.g., DC subcarrier is located at the boundary of PRBs
            This should be considered in the RS design for NR
            Specify means for the receiver to determine DC subcarrier location
                This involves semi-static signalling from UE and also standard specified DC subcarrier
                location
                FFS how to determine and how to indicate DC subcarrier location in the case of bandwidth
                adaptation
    Note that above DC subcarrier can be interpreted as DC subcarrier candidate
Agreements:
    RAN1 should consider the impact of the potential receiver DC subcarrier collision with RS used by that
    receiver, and whether NR design would offer the possibility of collision free operation
        Note that this does not create the requirement for receiver on receiver DC subcarrier handling First, a description will be given of how a sidelink DC subcarrier is determined. A UE may generate a sequence for sidelink signal transmission, map the sequence to a plurality of subcarriers around a DC subcarrier, and then transmit the mapped sequence for sidelink signal transmission. Alternatively, the UE may receive a sidelink signal from another UE and decode the sidelink signal with respect to a sidelink DC subcarrier.

The position of the sidelink DC subcarrier may be inherited from the position of a DC subcarrier used when the UE transmits a UL signal to an eNB or the position of a DC subcarrier used when the UE receives a DL signal from the eNB. In this case, the legacy UL or DL DC subcarrier is still used, thereby obviating the need for configuring a sidelink DC subcarrier additionally. For example, when the DL DC subcarrier is inherited, the UE may reuse the whole or part of a DL reception circuit for a sidelink. When the UL DC subcarrier is inherited, the UE may reuse the whole or part of a UL transmission circuit for the sidelink. Further, advantageously, there is no need for retuning a DL or UL transmission/reception radio frequency (RF) circuit for sidelink transmission and reception.

A plurality of DC subcarriers may be configured for transmission of a DL signal from the UE to the eNB. In this case, it may be regulated that a specific DL DC subcarrier is used as a sidelink DC subcarrier. For example, it may be regulated that a DL DC subcarrier for eMBB is used as a sidelink DC subcarrier.

Alternatively, it may be regulated that a DL DC subcarrier is basically used as a sidelink subcarrier. It may be regulated that unless otherwise signaled (e.g., unless a sidelink DC subcarrier is signaled), a DC subcarrier used for transmission of a synchronization signal may be configured as a default sidelink DC subcarrier, whereas only if otherwise signaled (e.g., only if a sidelink DC subcarrier is signaled), a sidelink DC subcarrier of a corresponding resource pool or a sidelink DC subcarrier of a corresponding service may be used exceptionally. For example, when a plurality of DC subcarriers are configured for transmission of a DL signal from the UE to the eNB and a sidelink DC subcarrier is indicated by signaling, the sidelink DC subcarrier may be one of DC subcarriers configured for respective resource pools. Alternatively, when a plurality of DC subcarriers are configured for transmission of a DL signal from the UE to the eNB and a sidelink DC subcarrier is indicated by signaling, the sidelink DC subcarrier may be one of DC subcarriers configured for respective services. The services may include vehicle-to-everything (V2X) and narrowband Internet of things (NB-IoT).

A network may signal information indicating a DL or UL DC subcarrier with which a sidelink DC subcarrier is aligned to a UE which performs sidelink transmission/reception.

A plurality of UL DC subcarriers may also be configured on UL. These UL DC subcarriers may be configured separately for RACH transmission for different services. If multiple UL/DL DC subcarriers are allowed to be configured as such, the network may indicate which one of the multiple UL or DL DC subcarriers is used as a sidelink DC subcarrier to the UE by physical-layer signaling or higher-layer signaling. This method is advantageous in that a transmission/reception circuit may be reused by reusing one of legacy UL/DL DC subcarriers.

A sidelink DC subcarrier may be configured irrespective of resource pools or on a resource pool basis. Specifically, a sidelink operating bandwidth (BW) may be defined within a system BW, and a DC subcarrier may be configured within the sidelink BW. This amounts to configuring a common DC subcarrier for sidelink subframes independently of sidelink resource pools. This method may be understood as configuring a DC subcarrier applied commonly to multiple resource pools. This method enables the UE to receive a signal using a single DC subcarrier, even though a plurality of sidelink resources pools are multiplexed in frequency division multiplexing (FDM). Alternatively, a sidelink DC subcarrier may be configured for each individual sidelink resource pool. That is, a DC subcarrier is configured individually on a resource pool basis. According to a network configuration, the same DC subcarrier may be configured for a plurality of pools. This method is advantageous in that a synchronization signal/RS may be separately configured without transmission and reception in another service or application by configuring a different DC subcarrier for a specific service or application.

In the foregoing methods (particularly, the method of configuring a DC subcarrier in relation to a resource pool), DL DC subcarriers may be avoided on purpose to configure a sidelink DC subcarrier. This is intended to avoid collision with DL DC subcarriers and hence interference with the DL DC subcarriers. However, when a DL and a sidelink are multiplexed in time division multiplexing (TDM), this condition may be unnecessary. Accordingly, only when a DL and a sidelink are multiplexed in FDM, different DC subcarriers may be configured exceptionally for the DL and the sidelink.

Half-subcarrier shifting (DL and UL are spaced from each other by a half-subcarrier with respect to a DC subcarrier) may be applied to sidelink transmission and reception. The half-subcarrier shifting, which is intended to reuse a legacy LTE transmitter/receiver, may be used in a dedicated sidelink band. Half-subcarrier shifting information may be configured for the UE by the network by physical-layer or higher-layer signaling, or may be preconfigured for the UE. On the other hand, an LTE circuit may be reused only for a synchronization signal, whereas an NR circuit may be reused for data transmission and reception. For this purpose, information about half-subcarrier shifting of a PSSCH/PSCCH may be signaled by a PSBCH or an SLSS. The UE may receive the synchronization signal, detect half-subcarrier shifting information for a subsequent data transmission/reception, and reflect the half-subcarrier shifting information in the subsequent operation. Considering that reuse of an LTE sidelink circuit is sought as much as possible with half-subcarrier shifting, the use of a legacy LTE circuit only for synchronization signal transmission/reception and the use of a new NR circuit for more efficient data transmission/reception may increase the efficiency of data transmission/reception.

A sidelink DC subcarrier will be described below in relation to a synchronization signal.

A DC subcarrier for transmitting and receiving a sidelink synchronization signal may be aligned with a specific DC subcarrier configured for DL or UL. That is, a DC subcarrier that the UE uses to transmit the sidelink synchronization signal may be determined regardless of the sidelink DC subcarrier. This method has the advantage of reusing the whole or part of a legacy synchronization signal reception (or transmission) circuit for DL or UL. That is, since the legacy synchronization signal reception circuit for DL may be reused, the implementation complexity of the UE may be lowered.

On the other hand, the DC subcarrier of a sidelink synchronization signal may be aligned with a network-configured or pre-configured sidelink DC subcarrier. This method may be easily used when different synchronization signals are configured for different services. That is, when a different synchronization signal is transmitted for each service, a DC subcarrier used to transmit a sidelink synchronization signal is aligned with the sidelink DC subcarrier. Specifically, for example, in the case of V2X and NB-IoT, a V2X DC synchronizing signal may be based on a V2X DC subcarrier, and an NB-IoT synchronizing signal may be based on a DC subcarrier for NB-IoT.

The sidelink DC subcarrier may be located between subcarriers carrying data, or overlap with a subcarrier carrying data. In this regard, a method of generating/mapping an RS may be different.

If a DC subcarrier is located between data subcarriers, an RS may be mapped to all subcarriers as is done conventionally. If the DC subcarrier is located in a particular data subcarrier, the RS may be mapped with that position left empty. Specifically, the subcarrier is punctured and the RS is mapped. That is, the RS is generated irrespective of the presence or absence of the DC subcarrier, and if the frequency area of the transmission RS includes the DC subcarrier, the RS is not transmitted at the position of the DC subcarrier. This method may be advantageous in that the complexity of implementation is low because an RS is generated and used regardless of the presence or absence of a DC subcarrier. In another method, the RS is generated on the assumption of the absence of the corresponding subcarrier, and then the RS is sequentially mapped by skipping the corresponding subcarrier. That is, when the RS is generated, it is assumed that there is no DC subcarrier among the subcarriers to which the RS is mapped. In this operation, if the frequency area carrying the RS includes the DC subcarrier, the RS is generated by excluding the position. In the current LTE UL, a Zadoff-Chu (ZC) sequence for a largest prime number is generated for as many REs as 12 times an RB size when the RS is generated, and the remaining part is filled by cyclic shifting. Therefore, when a length based on the assumption that there is no DC subcarrier, for example, 6 RBs are transmitted, an RS is generated for 71 REs, not for 72 REs.

If a sequence for sidelink signal transmission is a ZC sequence, the number of cyclic shifts (CSs) may be limited to a predetermined value or less. In the above method, there is a possibility that RS orthogonality is broken by not transmitting a specific subcarrier or by blanking and mapping the specific subcarrier. To prevent this, when a signal is transmitted in an RB including a DC subcarrier, the number of CSs may be limited to a predetermined number or less.

The above description may also be applied to UL or DL, not limited to direct communication between UEs. In this case, a BS or a relay node may use the above-described method.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Apparatus Configurations According to Embodiment of the Present Disclosure

Figure 12:
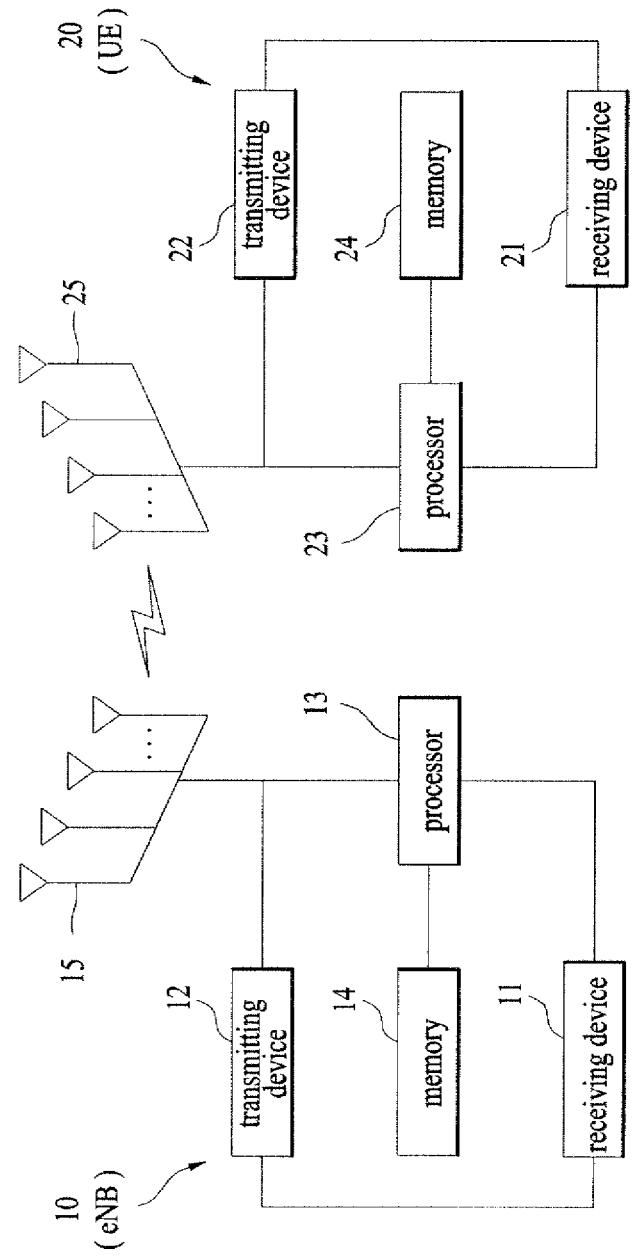
FIG. 12 is a block diagram illustrating a transmission device and a reception device.

FIG. 12 is a block diagram of a transmission point and a UE according to an embodiment of the present disclosure.

Referring to FIG. 12, a transmission point 10 according to the present disclosure may include a receiver 11, a transmitter 12, a processor 13, a memory 14, and a plurality of antennas 15. Use of the plurality of antennas 15 means that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 12, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

The processor 23 of the UE 20 according to an embodiment of the present disclosure may process requirements for each of the foregoing embodiments. Specifically, the processor may generate a sequence for sidelink signal transmission, map the sequence to a plurality of subcarriers around a sidelink DC subcarrier, and transmit the mapped sequence for sidelink signal transmission. The position of the sidelink DC subcarrier may be inherited from the position of a DC subcarrier used when the UE transmits a UL signal to the eNB or the position of a DC subcarrier used when the UE receives a DL signal from the eNB.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 12, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink signal by a user equipment (UE) in a wireless communication system, the method comprising:
  generating a sequence for sidelink signal transmission;
  mapping the sequence to a plurality of subcarriers around a sidelink direct current (DC) subcarrier; and
  transmitting the mapped sequence for sidelink signal transmission,
  wherein a position of the sidelink DC subcarrier is inherited from a position of a DC subcarrier used when the UE transmits an uplink signal to a base station (BS) or a position of a DC subcarrier used when the UE receives a downlink signal from a BS, wherein, based on the sequence for sidelink signal transmission being a Zadoff-Chu sequence, a number of cyclic shifts (CSs) is limited to a predetermined value or less.

2. The method according to claim 1, wherein a plurality of DC subcarriers are configured to be used when the UE transmits the downlink signal to the BS.

3. The method according to claim 1, wherein when a plurality of DC subcarriers are configured to be used when the UE transmits the downlink signal to the BS, and the sidelink DC subcarrier is indicated by signaling, the sidelink DC subcarrier corresponds to one of DC subcarriers configured for respective resource pools.

4. The method according to claim 1, wherein when a plurality of DC subcarriers are configured to be used when the UE transmits the downlink signal to the BS, and the sidelink DC subcarrier is indicated by signaling, the sidelink DC subcarrier corresponds to one of DC subcarriers configured for respective services.

5. The method according to claim 1, wherein the sidelink DC subcarrier is commonly applied to resource pools.

6. The method according to claim 1, wherein a DC subcarrier used for the UE to transmit a sidelink synchronization signal is determined independently of the sidelink DC subcarrier.

7. The method according to claim 1, wherein when different synchronization signals are transmitted for different services, a DC subcarrier used to transmit a sidelink synchronization signal is aligned with the sidelink DC subcarrier.

8. The method of claim 7, wherein the services include vehicle to everything (V2X) and narrowband-Internet of things (NB-IoT).

9. The method according to claim 1, wherein the sidelink DC subcarrier is located between subcarriers carrying data.

10. The method according to claim 1, wherein the sidelink DC subcarrier overlaps with a subcarrier carrying data.

11. The method of claim 10, wherein the sidelink DC subcarrier overlapped with the subcarrier carrying data is excluded from reference signal mapping.

12. A user equipment (UE) for transmitting a sidelink signal in a wireless communication system, the UE comprising:

a transmitter and a receiver; and a processor, wherein the processor is configured to generate a sequence for sidelink signal transmission, map the sequence to a plurality of subcarriers around a sidelink direct current (DC) subcarrier, and transmit the mapped sequence for sidelink signal transmission, wherein a position of the sidelink DC subcarrier is inherited from a position of a DC subcarrier used when the UE transmits an uplink signal to a base station (BS) or a position of a DC subcarrier used when the UE receives a downlink signal from a BS, and wherein, based on the sequence for sidelink signal transmission being a Zadoff-Chu sequence, a number of cyclic shifts (CSs) is limited to a predetermined value or less.

13. The UE of claim 12, wherein the UE is included in an autonomous vehicle.

* * * * *